US005470521A

United States Patent [19]

Wenzel et al.

[11] Patent Number: 5,470,521

[45] Date of Patent: Nov. 28, 1995

[54] METHOD FOR THE THERMAL DENSIFICATION OF THERMOPLASTIC ARTICLES

[75] Inventors: Richard A. Wenzel, Pittsford; Lewis E. Sable, Rochester; Charles M. Krutchen, Pittsford; Phillip A. Williams, Naples, all of N.Y.

[73] Assignee: Mobil Oil Corporation, Fairfax, Va.

[21] Appl. No.: 210,268

[22] Filed: Mar. 17, 1994

Related U.S. Application Data

[63] Continuation of Ser. No. 991,725, Dec. 15, 1992, abandoned, which is a continuation of Ser. No. 775,621, Oct. 10, 1991, abandoned, which is a continuation-in-part of Ser. No. 476,087, Feb. 7, 1990, abandoned, and a continuation-in-part of Ser. No. 698,245, May 6, 1991, abandoned, which is a continuation-in-part of Ser. No. 381,929, Jul. 19, 1989, abandoned.

[51] Int. Cl.[6] .................... B29C 35/02

[52] U.S. Cl. .................... 264/321; 264/37; 264/DIG. 69

[58] Field of Search .................... 264/37, 321, DIG. 69

[56] References Cited

U.S. PATENT DOCUMENTS

| | | | |
|---|---|---|---|
| 3,344,212 | 9/1967 | Francis | 264/37 |
| 3,504,399 | 4/1970 | Wolf | 264/321 |
| 3,531,562 | 9/1970 | Serrano et al. | 264/37 |
| 3,535,408 | 10/1970 | Ronden | 264/37 |
| 3,607,999 | 9/1971 | Corbett et al. | 364/25 |
| 3,723,582 | 3/1973 | Wilnstead | 264/37 |
| 3,859,404 | 1/1975 | Immel et al. | 264/89 |
| 4,033,907 | 7/1977 | Wolf | 528/489 |
| 4,189,291 | 2/1980 | Longhi | 264/DIG. 69 |
| 4,254,068 | 3/1981 | Otsuka | 264/37 |
| 4,396,566 | 8/1983 | Brinkmann et al. | 264/70 |
| 4,504,436 | 3/1985 | Louvier et al. | 264/321 |
| 4,531,950 | 7/1985 | Burt | 264/37 |
| 4,601,864 | 7/1986 | Vreenegoor | 264/37 |
| 4,706,560 | 11/1987 | Capodicasa | 100/102 |
| 4,828,238 | 5/1989 | Mozieka et al. | 264/321 |
| 5,059,376 | 10/1991 | Pontiff et al. | 264/37 |
| 5,116,363 | 5/1992 | Romweber et al. | 34/22 |

FOREIGN PATENT DOCUMENTS

| | | | |
|---|---|---|---|
| 50-107084 | 8/1975 | Japan | 264/DIG. 69 |
| 52-049280 | 4/1977 | Japan . | |
| 55-087523 | 7/1980 | Japan . | |
| 55-150323 | 11/1980 | Japan . | |
| 56-111635 | 9/1981 | Japan | 264/37 |
| 57-5723 | 1/1982 | Japan . | |
| 60-234830 | 11/1985 | Japan | 264/37 |
| 62-242507A | 10/1987 | Japan . | |
| 63-242505A | 10/1988 | Japan . | |
| 884896 | 12/1961 | United Kingdom | 264/37 |

*Primary Examiner*—Allan R. Kuhns

*Attorney, Agent, or Firm*—Alexander J. McKillop; Malcolm D. Keen; Clinton H. Hallman, Jr.

[57] ABSTRACT

An apparatus for thermally densifying thermoplastic articles, particularly those of the expendable type. The apparatus includes a chamber for placing the thermoplastic articles within, a heater for heating the thermoplastic articles placed within the chamber to a temperature effective for the thermal densification of the thermoplastic articles, a temperature sensor located proximate to the heater, and a controller for controlling the heater responsive to the temperature sensor, which is capable of providing a temperature within a range from about the temperature effective for thermally densifying thermoplastic articles to a temperature below the point of significant thermal degradation of the thermoplastic articles. A process for the thermal densification of thermoplastic articles are also provided.

11 Claims, 9 Drawing Sheets

16
48
46
14
46
15
44
42
56
6
10
58
58
52
2
1
60
60
50
50
62
62
36
36
32
32
32
32
32
32
30
4
54
54
68
64
64
34
74
72
38
38
70
66
22
22
23
23

FOR PLASTIC MILK JUGS
MISCELLANEOUS PLASTICS
220
221
222
223
224
225
226
227
228
229
230
231
232
233
235
236

223
225
232
227
224
234
226
222

METHOD FOR THE THERMAL DENSIFICATION OF THERMOPLASTIC ARTICLES

RELATED APPLICATIONS

This is a continuation of application Ser. No. 07/991,725, filed on Dec. 15, 1992, now abandoned, which is a continuation of application Ser. No. 07/775,621, filed on Oct. 10, 1991, which application is a continuation-in-part of application Ser. No. 07/476,087, filed on Feb. 7, 1990, the contents of which are hereby incorporated by reference in its entirety, and a continuation-in-part of application Ser. No. 07/698,245, filed on May 6, 1991, the contents of which are hereby incorporated by reference in its entirety, which is a continuation-in-part of application Ser. No. 07/381,929, filed on Jul. 19, 1989, now abandoned.

FIELD OF THE INVENTION

The present invention relates to an apparatus for increasing the bulk density of discarded thermoplastic articles. More particularly, this invention relates to an apparatus employing a thermal process to densify discarded thermoplastic articles and to render food remains attached to such thermoplastic articles bacterially inert.

BACKGROUND OF THE INVENTION

Although expendable thermoplastic packaging is preferred by suppliers and consumers alike for many applications, many people are now concerned over the disposal of such packaging as landfill space becomes increasingly scarce. Packaging materials and containers make up approximately 30 percent of our municipal solid waste stream with packaging produced from thermoplastics accounting for approximately 13 percent of those packaging materials and containers. Greater emphasis is now being placed on the recycling of packaging materials as an important means of reducing our solid waste load.

A significant economical problem exists in the collection of plastic packaging of low bulk density. For example, the typical blow-molded one gallon milk bottle produced from high density polyethylene (HDPE) weighs only 60 grams yet occupies a volume in excess of 230 cubic inches. This equates to a bulk density on the order of less than 1 $lb/ft^3$, whereas HDPE in solid block form has a density of approximately 60 $lbs/ft^3$. This difference is even more pronounced for packaging produced from foamed polystyrene where container bulk densities on the order of 0.25 $lb/ft^3$ are typical even though the density of the polystyrene in solid block form is approximately the same as that of HDPE. Newly made foamed polystyrene food containers nested in stacks weigh about 4 to 6 $lbs/ft^3$ which is as dense as the product can be made without destroying its intended use. It is difficult to get discarded material this dense even with some compaction. As such, it is generally not economically feasible for the recycler to pick up discarded containers from consumers or businesses without some form of incentive to do so. The plastic food packaging that often contains food residue poses further problems.

The landfill disposal of thermoplastic packaging is also impacted to some extent by low bulk density. Although the problem at the landfill is certainly lessened by the fact that the thermoplastic articles are greatly compacted by the weight of compacting equipment and of subsequently disposed loads, they contribute to the volume of waste in the landfills and add to the cost of collecting and hauling such articles to the disposal site.

An industry which has seen a rapid increase in the use of thermoplastic packaging is the fast-food industry. Thermoplastic packaging offers many highly desirable characteristics and good economic value. Foamed polystyrene is used to form serving trays, hot drink cups, sandwich containers, containers for segregated hot and cold food, and compartmentalized hot food containers. A typical fast-food restaurant may use approximately 20 pounds of foamed polystyrene packaging per day. This small weight is still noteworthy given the fact that the typical sandwich container weighs less than 6 grams or approximately 1/100 of a pound. Even if it is assumed that one-half of this packaging material is taken off the premises of the restaurant in the form of carry-out items, a significant bulk volume of material (an equivalent of more than 750 sandwich containers) is left on site for disposal by the restaurant each day. Although the volume of material that must be handled in this case is quite large, the weight of recoverable polystyrene material is exceedingly small. If such a restaurant were to sell its recovered thermoplastic material to a recycler, the cost of collecting and transporting this material could easily exceed its value.

An added problem is that much of the post-consumer thermoplastic containers have residual food waste present on their inner walls. Without very quick collection and recycling, bacterial activity can present a health problem. This complicates the collection process at many locations where very low tonnage is discarded each day. The shear volume due to the low bulk density and the need to move the material to avoid health and safety issues make accumulating economical amounts for recycling prohibitive.

Another problem area is the disposal of thermoplastic waste at sea. At sea, waste materials are often collected and disposed of by dumping overboard. While much of the waste will decompose with time, or sink to the bottom of the sea, thermoplastic packaging materials generally do neither and eventually wash up on shore. The problems associated with collecting and storing low bulk density material at sea are more acute because of the limited space available for such tasks.

Therefore what is needed to address the disposal problems associated with thermoplastic packaging and containers of low bulk density is an apparatus and method for densifying these discarded thermoplastic articles and for rendering any food remains on these articles bacterially inert.

SUMMARY OF THE INVENTION

According to the present invention, there is provided an apparatus for thermally densifying thermoplastic articles comprising a chamber for placing thermoplastic articles within, means for heating the thermoplastic articles placed within the chamber to a temperature effective for thermal densification of the thermoplastic articles, a temperature sensing means located proximate to the heating means, means for controlling the heating means responsive to the temperature sensing means so as to provide a temperature within a range from about the temperature effective for thermally densifying thermoplastic articles to a temperature below the point of significant thermal degradation of the thermoplastic articles. In a preferred embodiment, the apparatus of the present invention is effective to render any food remains in or on the thermoplastic articles bacterially inert. A process for the thermal densification of thermoplastic articles is also provided.

Therefore, it is an object of the present invention to provide an apparatus to increase the bulk density of discarded thermoplastic articles, packaging and waste materials through a thermal process.

It is another object of the present invention to provide an apparatus capable of thermally densifying thermoplastic waste materials produced at a commercial or manufacturing location.

It is a further object of the present invention to provide an apparatus for the thermal densification of thermoplastic articles that would render food remains present on such articles bacterially inert.

It is still another object of the present invention to provide an apparatus for the thermal densification of thermoplastic waste having utility aboard naval vessels.

It is a still further object of the present invention to provide an effective process for the thermal densification of thermoplastic articles.

It is yet another object of the present invention to provide a process for the thermal densification of thermoplastic articles that would render food remains present on such articles bacterially inert.

It is a still further object of the present invention to provide a process for the thermal densification of thermoplastic waste at sea.

Other objects and the several advantages of the present invention will become apparent to those skilled in the art upon a reading of the specification and the claims appended thereto.

DETAILED DESCRIPTION OF THE INVENTION

The present invention relates to an apparatus and process for the thermal densification of thermoplastic articles, particularly those articles of the expendable type. The apparatus is adapted for primary use at a commercial establishment, such as a fast-food restaurant or a grocery store, and is sized to easily handle the thermal densification of thermoplastic waste produced during a day's business activities. The present invention is best understood by reference to the appended figures, which are given by way of example and not of limitation.

Figure 1:
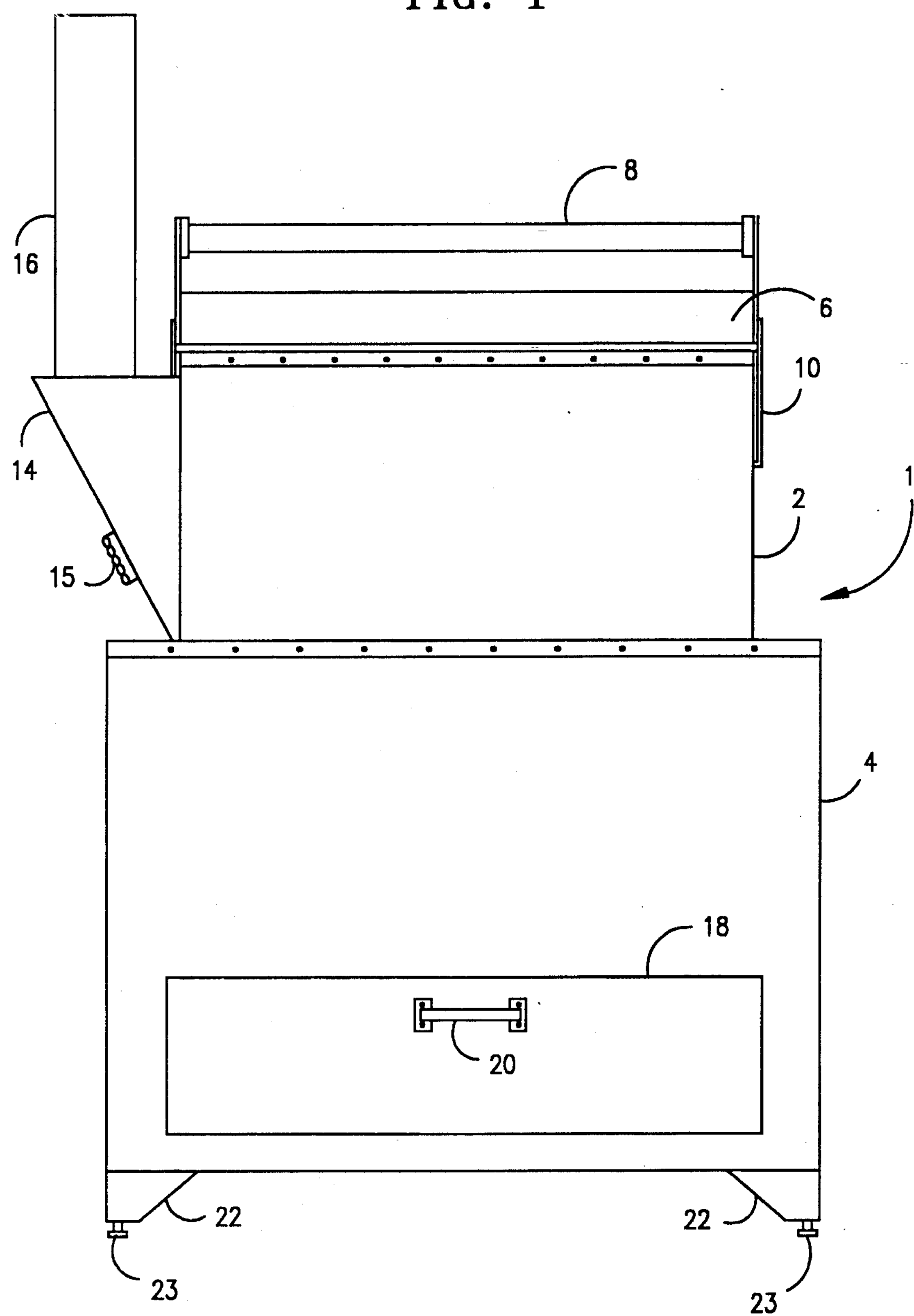
FIG. 1 is a frontal view of one embodiment of a thermal densification apparatus according to the present invention.

Referring now to FIG. 1, a frontal view of one embodiment of a thermal densification apparatus 1, according to the present invention, is shown. The apparatus shown is of a size appropriate for use in a commercial establishment, having the ability to house at least one large trash bag (approximately 20 to 40 gallons) of non-densified thermoplastic waste materials inside. The apparatus of FIG. 1 has an upper section 2 which has an opening at its top, covered by cover 6. Thermoplastic articles are placed inside apparatus 1 by first opening cover 6 by lifting handle 8, causing cover 6 to pivot away from the front of the unit on a pair of hinge members 10. (Hinge members 10 may be viewed in more detail by reference to FIG. 2.) Upon completion of the process of the present invention, the fully densified thermoplastic material may be removed by opening door 18 of lower section 4, using handle 20, and sliding out removable pan 34. (Removable pan 34 is shown in FIG. 3.) Heated process air is exhausted through exhaust stack 16 affixed to exhaust port housing 14. Fresh air for use in exhaust stream air dilution (optional) enters at fresh air entry 15. Legs 22 and adjustable feet 23 are provided to elevate the bottom of the apparatus from contact with the ground or floor upon which it is located and to level the apparatus. Also, casters can be mounted to legs 22 to facilitate movement of the apparatus. The legs also permit air to circulate underneath the apparatus.

Figure 2:
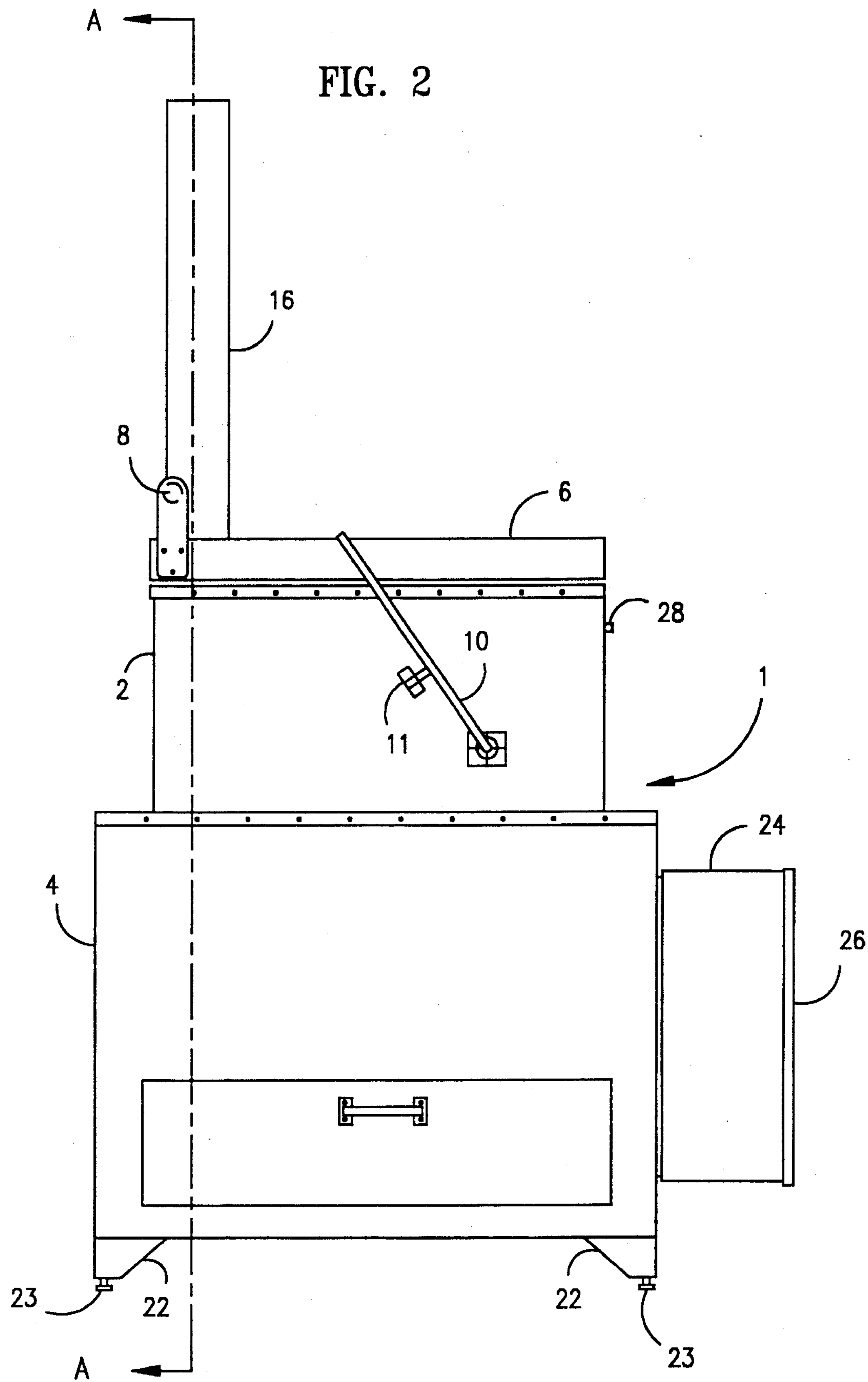
FIG. 2 is a side view of the FIG. 1 embodiment of a thermal densification apparatus.
Figure 3:
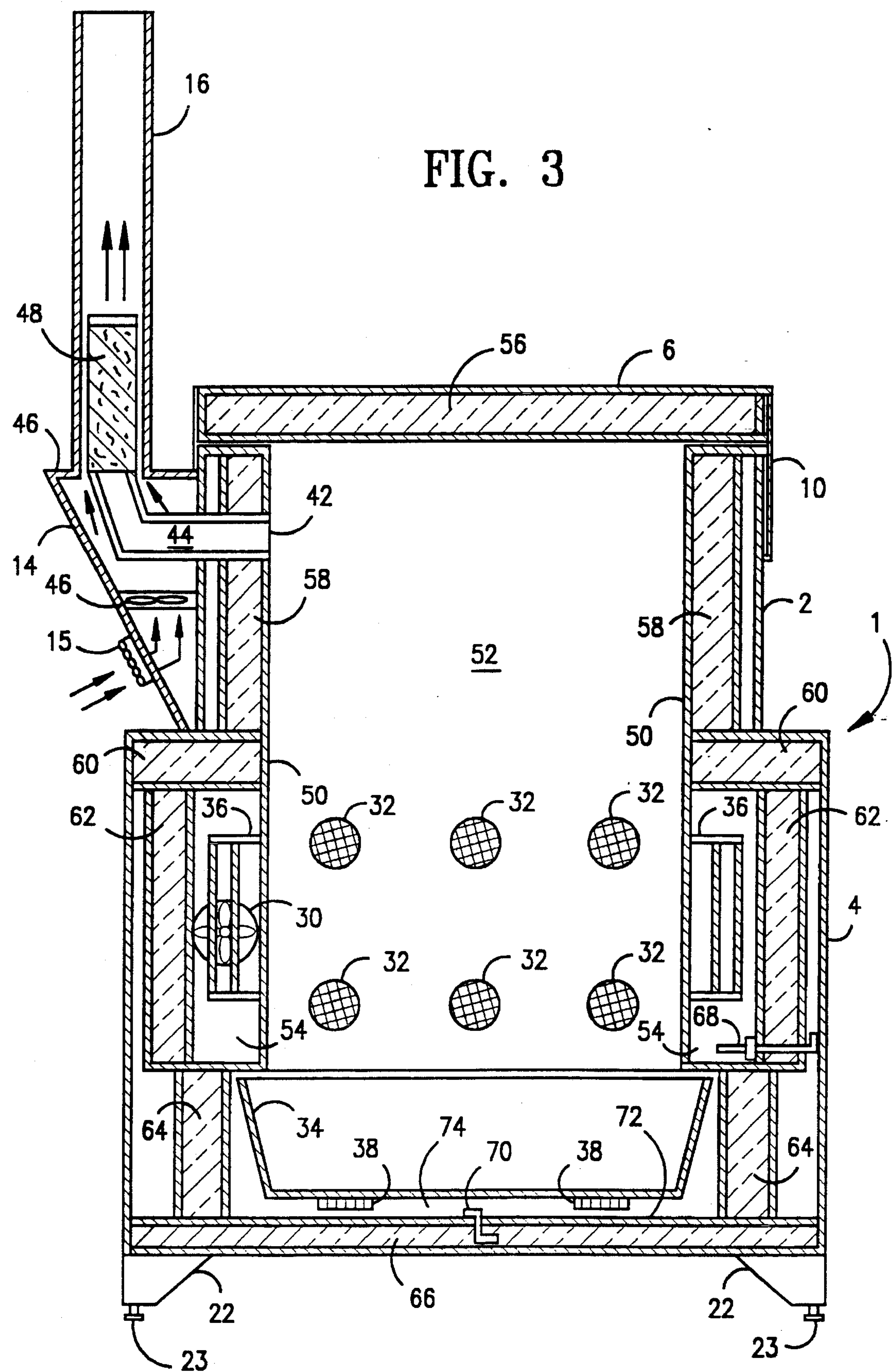
FIG. 3 is a view along section A—A of the FIG. 1 embodiment of a thermal densification apparatus.

Referring now to FIG. 2, a side view of the FIG. 1 embodiment of a thermal densification system is presented. As shown, hinge stop 28 is provided to prevent cover 6 from pivoting completely behind the thermal densification unit. Enclosure 24 is shown mounted to the rear of the thermal densification unit. Enclosure 24 houses the electrical controls for the unit, which include switching systems, temperature controllers, a fusing system, electrical wiring, and an electrical junction board (not shown). Access to these components is provided by hinged cover 26. For an extra measure of safety, contact switch 11 is provided to disable the heating system when cover 6 is opened for loading. Section line A—A is shown for reference thereto from FIG. 3.

A sectioned view of thermal densification apparatus 1 is presented in FIG. 3. As indicated, the section is taken along the line A—A, referred to in FIG. 2. The apparatus, including interior walls 50 which in part define heated air circulation chamber 54 and densification chamber 52, cover 6, outer cabinet sections 2 and 4, exhaust stack 16 and exhaust housing 14, is constructed of sheet metal. A wide variety of material is suitable for this application. For example, galvanized steel, aluminum, cold rolled steel, and stainless steel are excellent materials for constructing the apparatus of the present invention with cold rolled steel and stainless steel particularly preferred materials. Removable pan 34 may also be constructed of the same sheet metal material used to fabricate the apparatus. Pan 34 may be provided with tapered side walls, as shown, to facilitate removal of solidified material. To further facilitate removal of material, the interior surfaces of pan 34 may be coated with a non-stick surface coating such as industrial Teflon or stoneware.

Additional details concerning the apparatus and its operation will now be described by reference to FIG. 3. Thermoplastic articles are placed within the apparatus through cover 6, and enter densification chamber 52 to begin processing. Such articles may be loaded either by dumping individual articles into the apparatus, loosely, or by placing a thermoplastic trash bag which contains such articles inside. As can be appreciated, when seeking to segregate materials for recycling by thermoplastic material type, it may not always be desirable to discard the bag together with the articles, as the thermoplastic bag material may differ from the thermoplastic articles which it contains, resulting in significant contamination of the densified material and reducing its recovery value. When the thermoplastic articles are sufficiently reduced in size, the denser mass material will drop into pan 34. Thermoplastic articles in chamber 52 are initially heated by a forced-air heating system which is comprised of air inlet blower 30, one to two electrical resistance heaters 36, heated air circulation chamber 54 and a plurality of hot air inlets 32 leading into chamber 52. As can be envisioned, by virtue of the placement of air inlet blower 30, the heated air will circulate around heated air circulation chamber 54, which is defined in part by the outer walls of densification chamber 52, in a counterclockwise manner and pass through hot air inlets 32, at flow rates related to the resistance to flow imparted at each inlet by the thermoplastic articles undergoing the densification process and other factors. Greater densification is achieved by the combination of heating provided by resistance heaters 36 which heat circulating air in chamber 52 and by resistance heaters 38 located at the bottom of removable pan 34.

Heated air is exhausted through exhaust outlet 42 which leads to exhaust port 44 and exhaust stack 16. The air to be exhausted reaches exhaust outlet 42 through upward migration from the densification chamber 52 and pan 34. Exhaust and odor dilution may be provided by the use of fresh air pulled in and mixed with the exhaust from exhaust port 44 through the use of optional exhaust dilution fan 46. Optional filter 48 can also be employed in the exhaust stream to remove any smoke particles in the air exhausted from the apparatus.

With regard to heating requirements, while electrical resistance heating is particularly preferred, any type of heater capable of heating the contents of the apparatus to a temperature effective for the thermal densification of thermoplastic articles is acceptable. A type of electrical heating element which has been demonstrated to have utility in this application in chamber 54 is a serpentine-wound resistance heater. These elements can operate on 120 volts or 240 volts AC, depending upon the wattage used. As can be envisioned, a plurality of these heating elements can be used to more evenly heat the apparatus. As shown in FIG. 3, a total of four heating elements are provided, with elements 36 located in heated air circulation chamber 54 to provide forced air heating and elements 38 located below removable pan 34 to provide additional heating mainly from the bottom of the pan. A particularly preferred heating arrangement provides a total heating capacity of from 4,000 to 12,000 watts, an amount effective to thermally densify thermoplastic articles even when the apparatus is used outdoors during severe winter conditions.

Temperature sensors 68 and 70 are provided for monitoring system temperatures. While thermocouples are preferred for use as temperature sensors 68 and 70, thermistors, pyrometers and the like are also acceptable. Although an inner air circulation chamber temperature monitoring arrangement is shown for temperature sensor 68, it is known that other arrangements, such as an inner or outer chamber surface monitoring arrangement, would produce entirely acceptable results. Surface monitoring is particularly pertinent to the location of temperature sensor 70 which can be attached to bottom wall 72 of lower heating chamber 74, as shown, or mounted so as to contact the bottom of pan 34. The output of temperature sensors 68 and 70 are fed into temperature controllers (not shown, but located within enclosure 24) creating temperature feedback loops capable of assuring that the heating provided is of a level capable for effective thermoplastic thermal densification, but not so high as to chemically decompose or ignite the thermoplastic contents of the apparatus. The temperature controller can be of the adjustable variety, such as those marketed by Eurothem, Inc. or Tempco, Inc., permitting the safe and effective thermal densification of a wide variety of thermoplastic materials.

The temperature setting for the process of the present invention will generally be one which is at least effective for the thermal densification of the thermoplastic articles placed within the apparatus. While this will generally be a temperature of at least about 250° F., it is preferred that the temperature not exceed a value which would alter the molecular weight of the thermoplastic articles by an amount exceeding 50% of their original molecular weight. In no case should the temperature selected be one which produces thermal ignition of the thermoplastic or other material in the apparatus.

To minimize process energy requirements and keep the apparatus from becoming excessively hot to the touch, insulation should be advantageously utilized. As shown in FIG. 3, a preferred arrangement employs insulative panels adjacent to virtually all heated areas of the apparatus. As may be seen, insulative panel 56 is located within the walls of cover 6, insulative panels 58 surround the upper portion of chamber 52, insulative panels 62 surround heated air circulation chamber 54, insulative panels 60 surround the mid portion of chamber 52, as well as the top portion of heated air circulation chamber 54, insulative panels 64 surround the sides of removable pan 34, and insulative panel 66 is located within the walls of the bottom of the apparatus. Since the temperature required to thermally densify most thermoplastic materials will normally be in excess of about 250° F. (usually about 300° F. to about 350° F.), the insulative material selected should be one able to withstand such temperatures. Fiberglass-based insulation is one such material known to have utility in this application.

To prevent the build-up of excessive moisture and fumes within the apparatus during use, a flow-through ventilation system is provided. This system consists in its essential elements of outlet 42, exhaust port 44, located within exhaust port housing 14, and exhaust stack 16 in communication with exhaust port 44. Air is pulled into the apparatus at inlet blower 30 and is adjusted to circulate air at a flow rate of about 15 to 35 SCFM through the unit, with a flow rate of about 25 SCFM preferred. Optionally, exhaust dilution fan 46 may be provided to provide a flow of fresh air into the exhaust system for diluting the exhaust heat which passes into the exhaust port from exhaust outlet 42. Exhaust dilution fan 46 should be capable of flowing at least about 100 SCFM for optimal effectiveness. Another option is the use of a filter element 48, which can be of the activated charcoal-type, to remove any smoke particles from the exhaust. It is also within the scope of the present invention to provide an inert gas ventilation system (not shown), rather than a fan-assisted ventilation system. Pressurized nitrogen can be effectively used in this regard. The use of inert gas can provide an additional measure of safety in the operation of the process of this invention.

Figure 4:
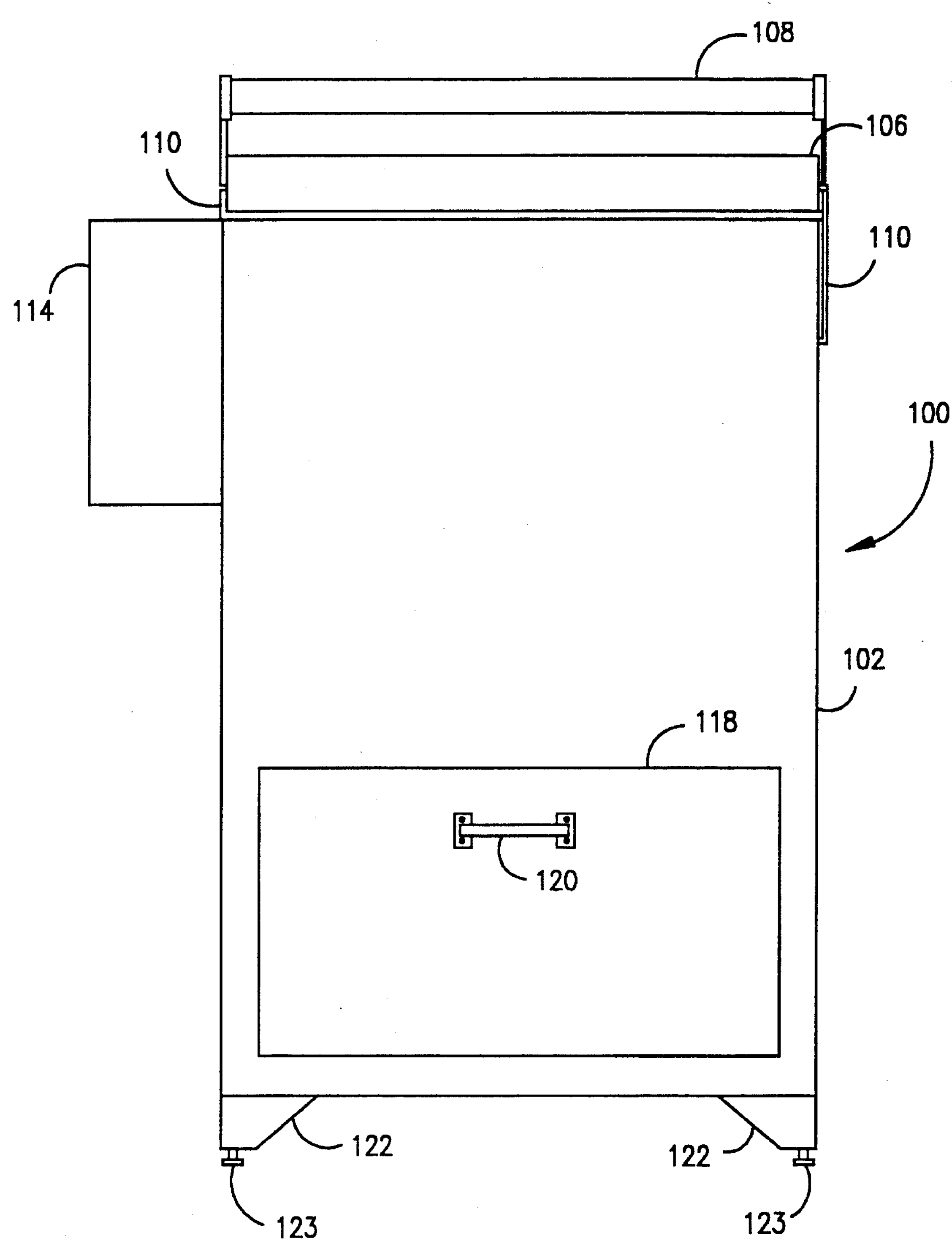
FIG. 4 is a frontal view of second embodiment of a thermal densification apparatus according to the present invention.

A second embodiment of the present invention is depicted in FIG. 4. Referring now to FIG. 4, a frontal view of thermal densification apparatus 100 is shown. As was the case with the previously described embodiment, the apparatus of FIG. 4 is of a size appropriate for use in a commercial establishment, having the ability to house one large trash bag (approximately 20 to 40 gallons) of non-densified thermoplastic waste materials inside. The apparatus of FIG. 4 has cabinet 102, which houses inside chambers 150 and 152 (see FIG. 6), into which thermoplastic articles are placed for thermal densification by first lifting handle 108 of cover 106, causing cover 106 to pivot away from the front of the unit on a pair of hinge members 110 (see FIG. 5.) Once inside, the thermoplastic articles pass into and through chambers 150 and 152 and into pan 134 through opening 180 (see FIG. 6). Referring now to FIGS. 4 and 6, the densified thermoplastic material in pan 134 may be removed by opening door 118, using handle 120, and sliding out removable pan 134. When the thermoplastic material is cooled, it may be removed from pan 134 by turning the pan upside down. Pan 134 is provided with tapered side walls to facilitate removing the material. To further facilitate removal of material, the interior surfaces of pan 134 may be coated with a non-stick surface coating such as industrial Teflon or stoneware. Hot air is exhausted through exhaust port 144, located within exhaust port housing 114, shown in FIG. 6.

Legs 122 are provided to elevate the bottom of the apparatus from contact with the ground or floor upon which it is located, permitting air to circulate underneath the apparatus. Legs are also provided with adjustable feet 123 which enable the apparatus to be leveled upon an uneven surface. Also, casters can be mounted to legs 122 to facilitate movement of the apparatus.

Figure 5:
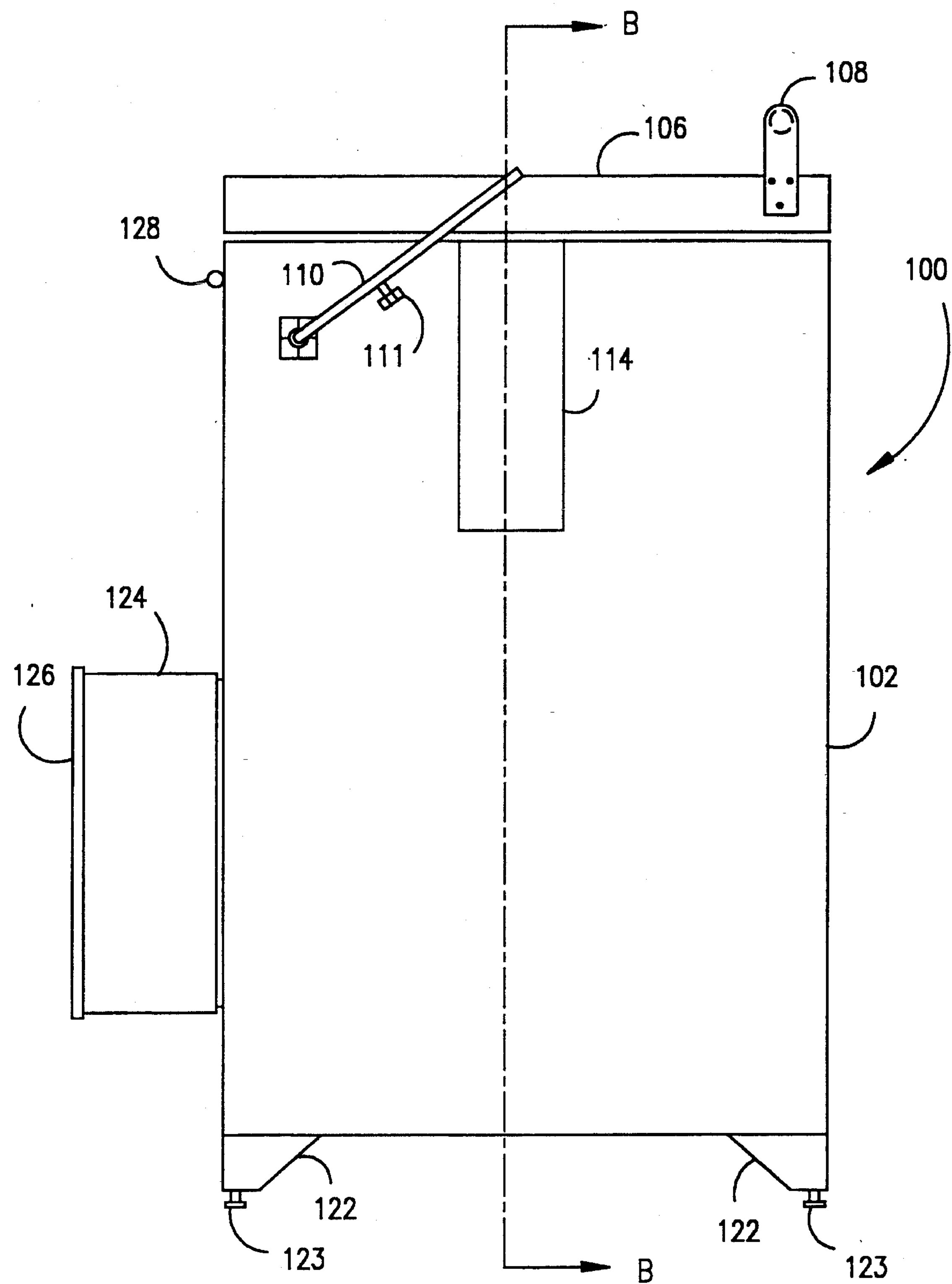
FIG. 5 is a side view of the FIG. 4 embodiment of a thermal densification apparatus.
Figure 6:
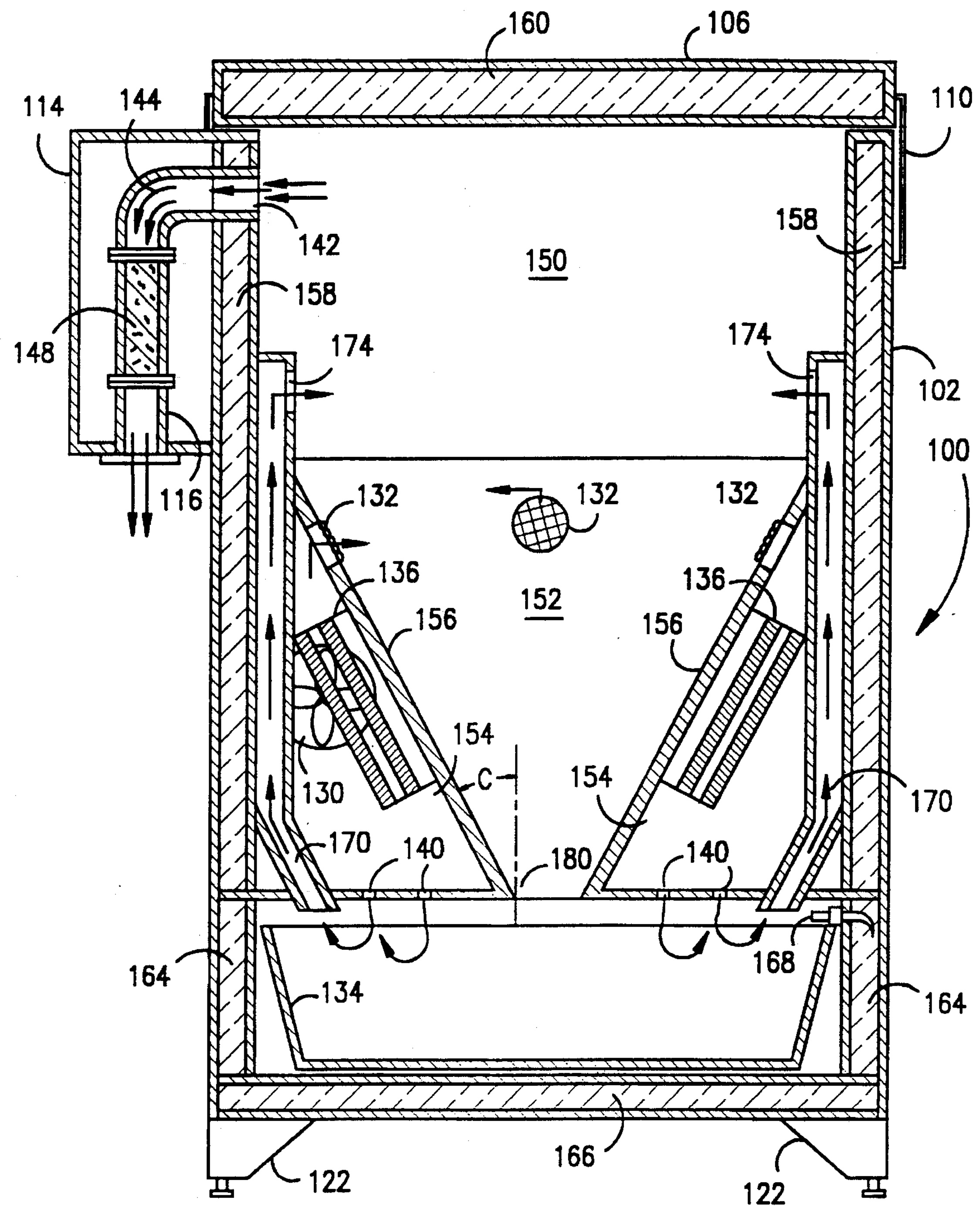
FIG. 6 is a view along section B—B of the FIG. 4 embodiment of a thermal densification apparatus.

Referring now to FIG. 5, a side view of the FIG. 4 embodiment is presented. As shown, hinge stop 128 is provided to prevent cover 106 from pivoting completely behind the thermal densification unit. Enclosure 124 is shown mounted to the rear of the thermal densification unit. Enclosure 124 houses the electrical controls for the unit, which, as with the previously described embodiment of FIG. 1, include a switching system, temperature controller, fusing system, electrical wiring and an electrical connection junction board (not shown). Access to these components is provided by hinged cover 126. Contact switch 111 is provided to disable the heating system when cover 106 is opened for loading. Section line B—B is shown for reference thereto from FIG. 6.

A sectioned view of the thermal densification apparatus of the FIG. 4 embodiment is presented in FIG. 6. As indicated, the section is taken along the line B—B, referred to in FIG. 5. The apparatus, including outer-cabinet 102, cover 106, pre-shrink chamber 150, conical densification chamber 152 and heat chamber 154 is constructed of sheet metal. Again, a wide variety of material is suitable for this application, with cold rolled steel and stainless steel particularly preferred. Removable pan 134 may also be constructed of the same sheet metal material used to fabricate the apparatus and coated with a non-stick material on the interior surfaces.

Additional details concerning the apparatus and its operation will now be described by reference to FIG. 6. Thermoplastic articles are placed within apparatus 100 through cover 106, and into pre-shrink chamber 150 to begin processing. As before, the articles may be loaded either by dumping individual articles into the apparatus, loosely, or by placing a thermoplastic trash bag which contains such articles inside. Pre-shrinking is effected through heated air which radiates upward from heated densification chamber walls 156, as well as by the flow of air, heated as described below, which emanates from ports 132 and 174. When the heat collapses the thermoplastic articles to a sufficient degree, the thermoplastic articles in pre-shrink chamber 150 will pass to densification chamber 152. When the articles pass to densification chamber 152, they continue to be heated by hot air and by heated sidewalls 156.

The heating system located in heat chamber 154 is comprised of air inlet blower 130, two electrical resistance heaters 136, heated air circulation chamber 154, heated chamber walls 156 and a plurality of hot air outlets 132 and 140. Again, by virtue of the placement of inlet blower 130, the heated air circulates around heated air chamber 154, which is defined in part by the outer walls of densification chamber 152, in a counterclockwise manner and passes through hot air inlets 132 and 140 at flow rates related to the resistance to flow imparted at each outlet by the thermoplastic articles undergoing the densification process and other factors. The material, in a more dense state, flows down the chamber walls 156 through opening 180 and into pan 134. To facilitate material flow, chamber walls 156 may be coated with a non-stick material such as industrial Teflon.

Orifice 180 may be sized based upon the overall dimensions of the typical articles to be densified. In other words, the articles generally should not drop through to the pan without first being subjected to the densification process. Accordingly, when fast-food type thermoplastic articles are to be the primary articles to be densified, it is preferred that orifice 180 be sized within a range of from about 2 inches to about 8 inches in diameter, with about 4 inches to about 6 inches in diameter particularly preferred. Should orifice 180 be formed to be substantially non-circular in cross section, its cross-sectional area should be sized to fall within the range of the cross-sectional areas of the preferred circular orifices.

Greater densification is achieved as the thermoplastic articles lose air cells and shape and the material passes through the narrowing conical densification chamber 152 and exits through orifice 180 as a viscous material into removable pan 134. Here the material is further heated by hot air from ports 140 and flows forming a block of densified material.

Referring still to FIG. 6, to achieve good performance from the apparatus of the present invention, it is preferred that the sidewalls 156 be fabricated to have an angle C, measured from a vertical plane through the apparatus, as shown, which falls within a range of angles from one which enables the bulk density of the articles to be increased by at least about 100 percent of original bulk density for the level of heat provided, up to one which permits the densified material to still flow downward without significant material accumulating on sidewalls 156. It is preferred that angle C fall within a range of from about 15° to 45°, with an angle C of 20° to 25° being particularly preferred.

Heated air is exhausted through exhaust outlet 142 which leads to exhaust port 144 and exhaust pipe 116. Exhaust air may reach exhaust outlet 142 through several ways, including upward radiation. Another route is by the upward heated air flow through orifice 180 and/or through tubes 170 which are fed by heated air flowing from heated chamber 154 through outlets 140.

Exhaust heat and odor dilution may be provided by the use of fresh air pulled in and mixed with exhaust from exhaust port 144 through the use of an optional exhaust dilution fan, not shown, but similar to that depicted for the embodiment of FIGS. 1 through 3. Optional filter 148 can also be employed in the exhaust stream to remove any smoke particles from the air exhausted from the apparatus.

Again, with regard to heating requirements, any type of heater capable of heating the contents of the apparatus to a temperature effective for the thermal densification of thermoplastic articles is acceptable. The electrical heating element described above as being preferred in the FIG. 1 embodiment has also been demonstrated to have utility in this embodiment. Again, this is a serpentine-wound resistance heater. These elements can operate on 120 or 140 volts depending on the wattage used. As shown, two such heating elements are used to evenly heat the apparatus, these being depicted in FIG. 6 as heating elements 136. Heating elements 136 are located in heating chamber 154. This particularly preferred heating arrangement provides a total heating capacity of about 4,000 to 10,000 watts, an amount effective to thermally densify thermoplastic articles even when the apparatus is used outdoors during severe winter conditions.

Temperature sensor 168 is provided for monitoring the temperature of the heating system. Although a particular monitoring arrangement is depicted, it is known that other arrangements would produce entirely acceptable results. The output of temperature sensor 168 is fed into a temperature controller (not shown, but located within enclosure 124) creating a temperature feedback loop capable of assuring that the heating provided is of a level capable for effective thermal densification of thermoplastic materials, but not so high as to chemically decompose or ignite the thermoplastic, or other materials, placed within the apparatus. The temperature controller can be of the same adjustable variety as those previously described, permitting the safe and effective thermal densification of a wide variety of thermoplastic materials.

The temperature setting used for the second embodiment of the present invention will again be one which is at least effective for the thermal densification of the thermoplastic articles placed within the apparatus. As before, while this will generally be a temperature of at least about 250° F., it is preferred that the temperature not exceed a value which would alter the molecular weight of the thermoplastic articles by an amount exceeding 50% of their original molecular weight. In no case should the temperature selected be one which produces thermal ignition of the thermoplastic material.

To minimize process energy requirements and keep the apparatus from becoming excessively hot to the touch, insulation is recommended. As shown in FIG. 6, a preferred arrangement employs insulative panels adjacent to a majority of the areas heated. As shown, insulative panel 160 is located within the walls of cover 106, insulative panels 158 surround pre-shrink chamber 150 and heated chamber 152, insulative panels 164 surround the sides of removable pan 134, and insulative panel 166 is located within the walls of the bottom of the apparatus. Since the temperature required to thermally densify most thermoplastic materials will normally be in excess of about 250° F. (usually about 300° F. to 350° F.), the insulative material selected should be one able to withstand such temperatures, with fiberglass-based insulation being one preferred material.

To prevent the build-up of excessive heat and fumes within the apparatus during use, a flow-through ventilation system is also provided in this embodiment of the present invention. This system consists in its essential elements of inlet fan 130, the forced air heating system, previously described, exhaust outlet 142, exhaust port 144, located within exhaust port housing 114, and exhaust pipe 116. Optionally, an exhaust dilution fan, not shown, may be provided to mix fresh air into the exhaust system and dilute the exhaust air which passes into the exhaust port 144. Also, optional filter element 148, which can be of the activated charcoal-type, can be provided. Moreover, an inert gas ventilation system (not shown) can be provided, rather than a fan-assisted ventilation system.

Figure 7:
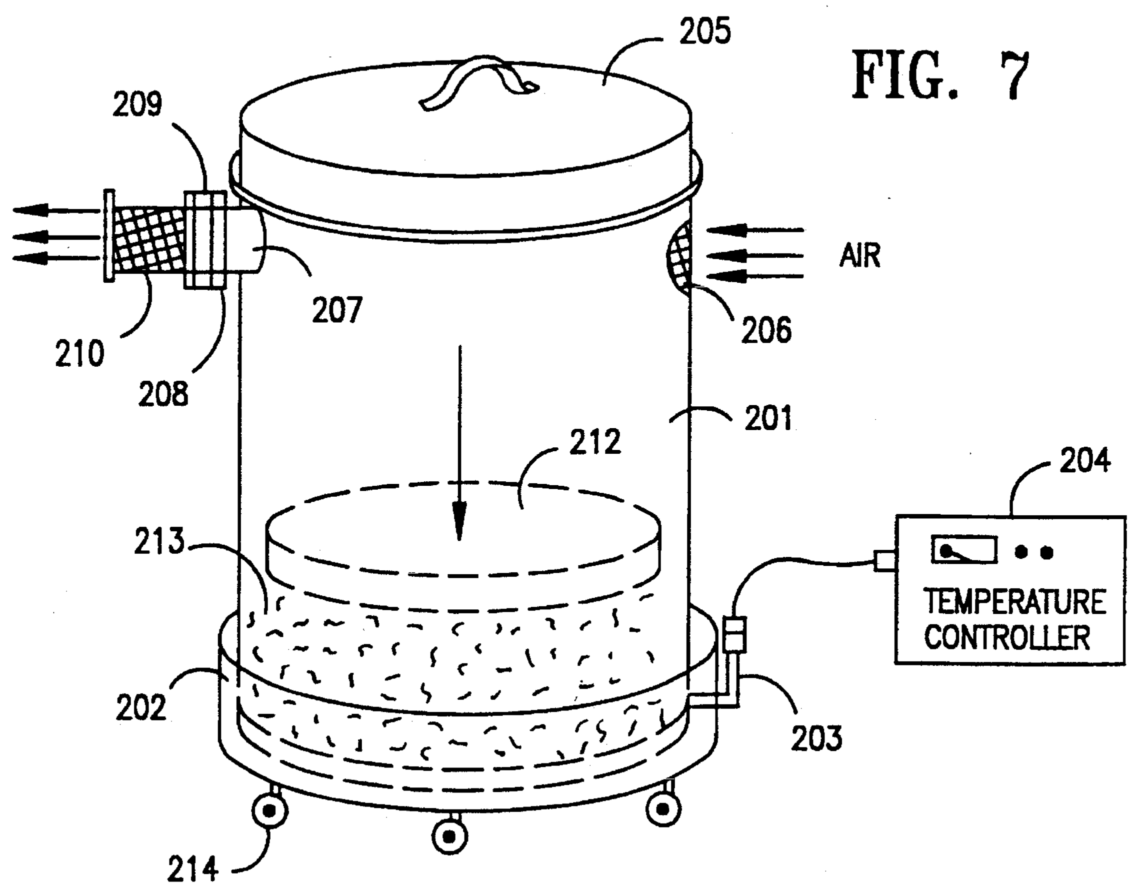
FIG. 7 is a view in perspective of an alternate embodiment of a thermal densification apparatus according to the present invention.

Referring now to FIG. 7, an alternate embodiment of a thermal densification apparatus of a type useful in a commercial establishment is depicted. The apparatus consists of a container 201 for placing thermoplastic articles 213 therein, the container also having a cover 205. Heating for the thermal densification process is provided by heating unit 202, which may be of the electrical resistance type or any other type capable of heating the contents of the container to a temperature effective for the thermal densification of thermoplastic articles 213. A type of electrical heating unit which has been demonstrated to have utility in this application is one commercially marketed by McMaster-Carr of Chicago, Ill. and sold as an drum platform heater. Preferred is such a heating unit having a power rating of about 1500 watts which operates on 115 volts or 230 volts AC. As may be envisioned, this type of heating unit provides heating of container 201 mainly from the container bottom, which is the manner of heating particularly preferred. As is known to those skilled in the art, it would be difficult to heat in from the sides of container 201, as opposed to heating from the bottom, due to the insulative value of the thermoplastic articles to be densified. Moreover, side heating may complicate cleanup of container 201 following use. The platform heater can also be used in conjunction with a circumferential band heater. Such heaters are also marketed by McMaster-Carr of Chicago, Ill. When used with the platform heater, the band heater is placed around container 201 at its bottom. A preferred band heater is one having a power rating of about 750 watts which operates on 115 volts or 230 volts. Temperature sensor 203 is provided for monitoring the outer surface temperature of container 201. Although an outer surface temperature monitoring arrangement is depicted, it is known that other arrangements, such as an inner surface monitoring arrangement, would produce entirely acceptable results. The output of temperature sensor 203 is fed into temperature controller 204, creating a temperature feedback loop assuring that the heating provided is of a level capable for effective thermoplastic thermal densification, but not so high as to chemically decompose or ignite the contents of container 201. Controller 204 can be of the adjustable variety, permitting the safe and effective thermal densification of a wide variety of thermoplastic materials.

Again, the temperature used for the process of the present invention will generally be one which is at least effective for the thermal densification of the thermoplastic articles 213 placed within container 201. While this will generally be a temperature of at least about 250° F., (usually about 300° F. to about 350° F.), it is preferred that the temperature does not exceed a value which would alter the molecular weight of the thermoplastic articles by an amount exceeding 50% of their original molecular weight. In no case should the temperature selected be one which produces thermal ignition of the thermoplastic material.

To minimize process energy requirements, insulation (not shown) may be advantageously utilized on the outer surface of container 201. To further assist in the thermal densification process, vented plate or screen 212 can optionally be provided. Vented plate 212 serves two purposes, the first being to exert a downward force on the thermoplastic articles undergoing the densification process, keeping them in intimate contact with the hot inner surface of container 201 and the pool or slurry of already densified thermoplastic material, the second purpose is to reduce system heat loss. The material selected for plate 212 should be one able to withstand process temperatures. As such, iron, steel and stainless steel are preferred materials, with stainless steel and stainless steel screen particularly preferred. When screen material is utilized a frame may be required to hold such material. Such a frame should be of a weight sufficient to achieve the first purpose stated above. If an expanded metal screen is utilized, no frame may be required due to the rigidity and weight normally possessed by such material.

To prevent the build-up of fumes within the apparatus during use, a fan assisted, flow-through ventilation system is provided in a preferred embodiment of the present invention. This system consists in its essential elements of screened inlet 206, and diametrically opposed outlet duct 207. Outlet duct 207 is shown in FIG. 7 as having a flange 208 for the mounting of exhaust fan 209 thereon. Mounted to the flange of exhaust fan 209 is filter element 210. Filter element 210 can be of the paper-type, activated charcoal-type, or the like. It is also within the scope of the present invention to provide an inert gas ventilation system (not shown), rather than a fan-assist ventilation system. Pressurized nitrogen can be effectively used in this regard. The use of inert gas can provide an additional measure of safety in the practice of the process of this invention. Also, casters 214 can be provided to facilitate movement of the apparatus.

As may be envisioned, the apparatus depicted in FIG. 7 will find utility in fast food restaurants, where the densification and recycling of polystyrene foam is a chief concern; at grocery stores, where the densification and recycling of thermoplastic grocery sacks and other plastics is desired; and, aboard ships where the disposal of thermoplastic waste at sea is becoming an ever-increasing concern among environmentalists. At most, only minor modifications to the basic apparatus would be required to adapt the thermal densification unit of the present invention to one of these applications.

Figure 8:
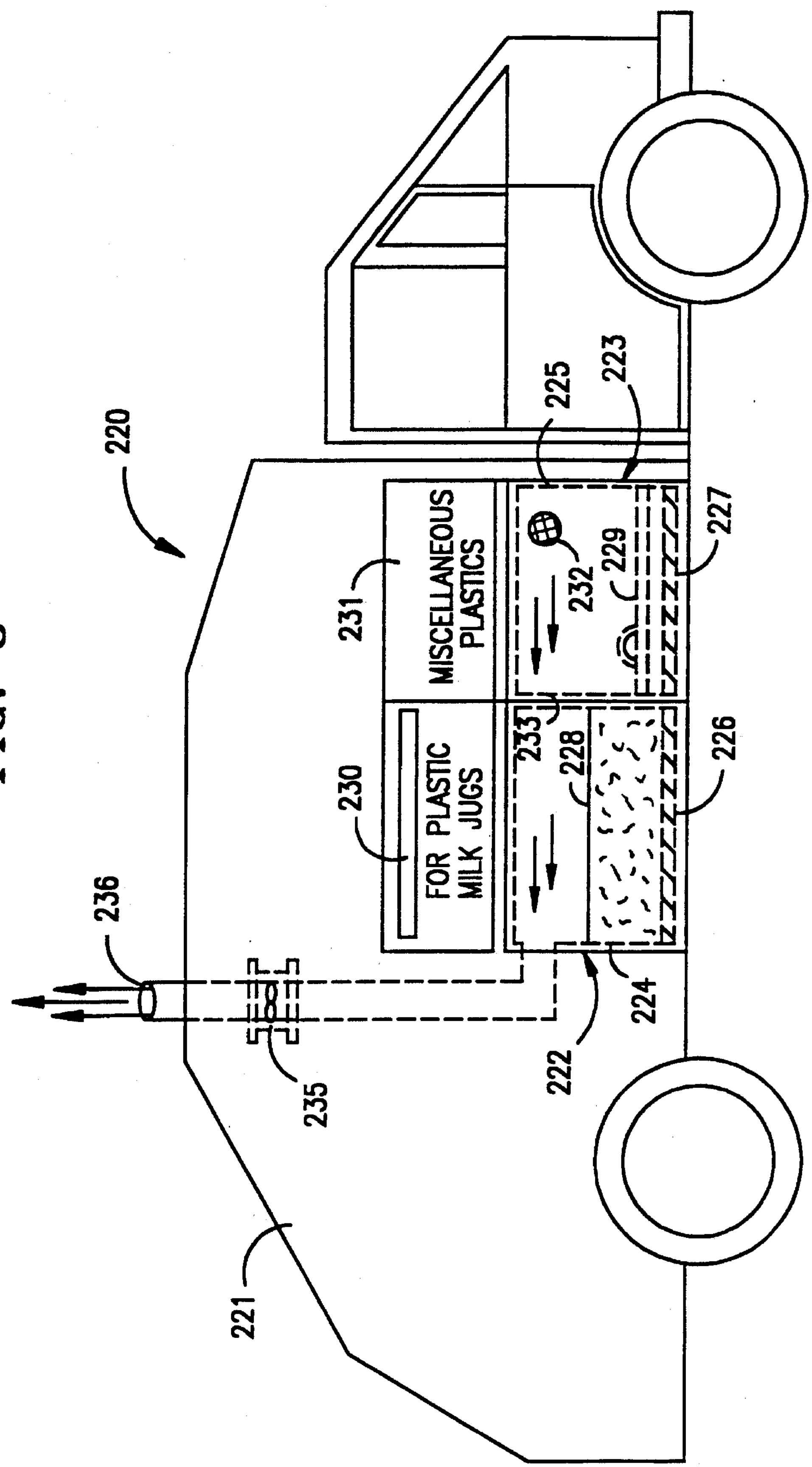
FIG. 8 is a side view of a refuse collection vehicle having two thermal densification systems installed therein.

When adapted for use in a refuse collection vehicle, the thermal densification apparatus of FIG. 7 will generally differ only in that it will be configured for housing within a separate compartment of the body of that vehicle and be capable of mobile operation. An example of such an embodiment is depicted in FIG. 8. As shown in FIG. 8, the body 221 of refuse collection vehicle 220 is equipped with two segregated thermal densification units 222 and 223. The two units are provided for the purpose of thermoplastic segregation. For example, as indicated in FIG. 8, thermal densification unit 222 is dedicated to increasing the bulk density of plastic milk jugs and like material containers, which are generally produced from HDPE, while thermal densification unit 223 is used for the densification of miscellaneous thermoplastics. Inserted within the body compartments of body 221 are removable containers 224 and 225 which are mounted upon separate heating elements 226 and 227. Heating elements 226 and 227 can advantageously be controlled by separate controllers using separate temperature sensing means (not shown) similar to those previously described. Such an arrangement would permit the tailoring of separate thermal densification units to the materials sought to be densified by each. Of course, such electrical equipment would have to be adapted to mobile use, which could be accomplished through the use of an AC to DC inverter, as those skilled in the art would clearly recognize.

Each unit is also shown equipped with vented plates 228 and 229 which serve to place a downward force on the material to be densified while also assisting in system heat retention. Vented plates 228 and 229 are shaped to essentially conform to the shape of containers 224 and 225 and may also be equipped with handles to aid in the use thereof. As with the thermal compaction unit of FIG. 7, vented plates 228 and 229 may also be constructed of a screen material so long as the resultant elements achieve the purpose of exerting a downward force on the thermoplastic articles. Each body compartment is shown having a hinged door (230 and 231), which can be closed when the vehicle is travelling from one pick-up site to another. Door 230 is shown in the opened position.

Figure 9:
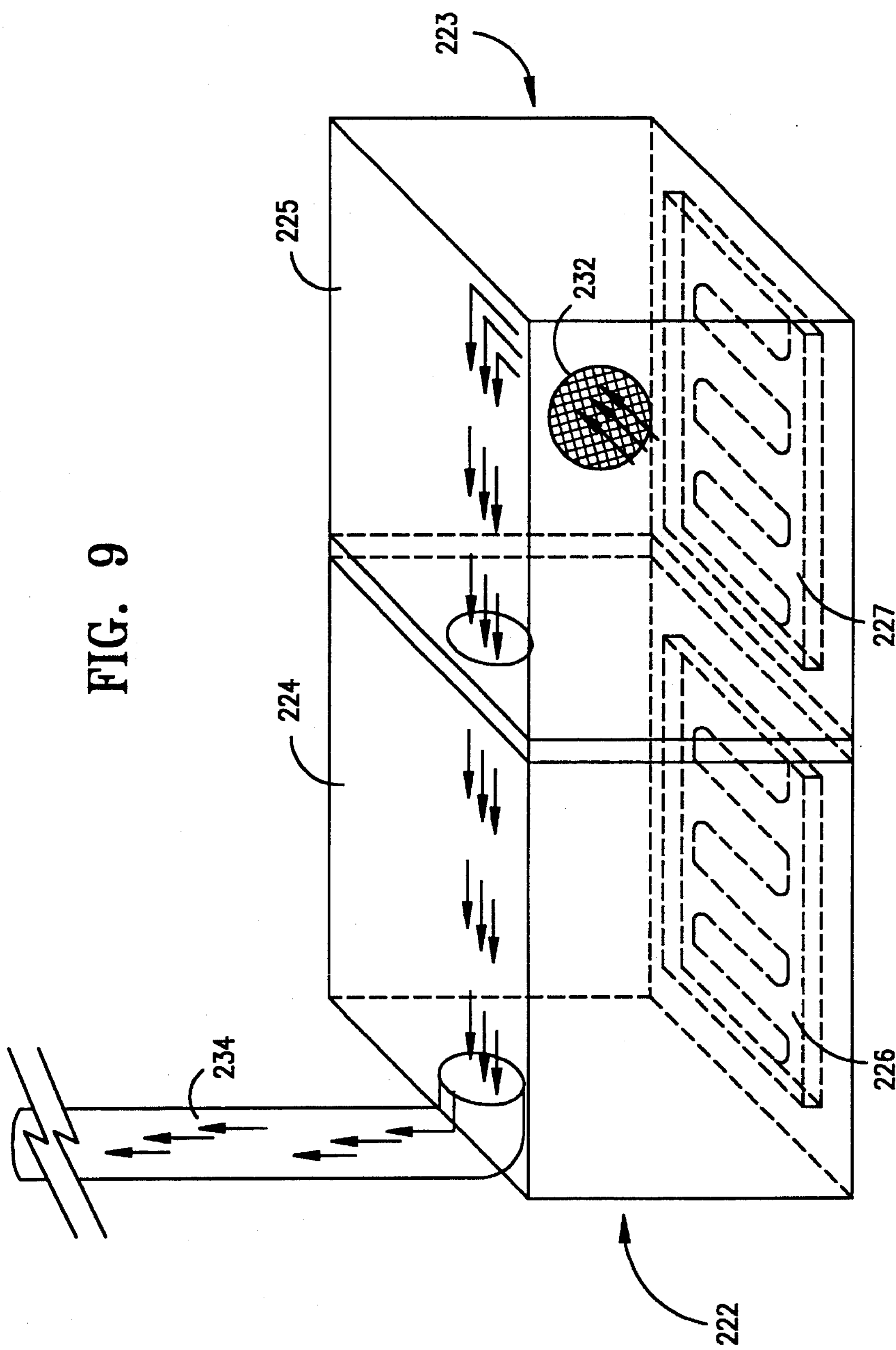
FIG. 9 is an enlarged view in perspective of a portion of the two thermal densification systems of the refuse collection vehicle.

The thermal compaction units of the vehicle shown in FIG. 8 are provided with a cross-flow ventilation system to prevent the build up of fumes within the units. As indicated, a single system can be utilized to ventilate both thermal compaction units. The system shown provides a screened air inlet vent 232, a co-communication path 233, between containers 224 and 225 exhaust pipe section 234, fan 235 and atmospheric duct 236. Further clarification regarding the details of this arrangement may be obtained by referring to FIG. 9 which provides an enlarged perspective view of key thermal densification system elements including removable containers 224 and 225, heating elements 226 and 227, as well as the ventilation system just described.

As may be envisioned, the present invention will find utility in fast-food restaurants, where the densification and recycling of polystyrene foam is a chief concern; at grocery stores, distribution centers and warehouses for the densification of thermoplastic packaging and containers; in fabricating facilities utilizing thermoplastic materials; aboard ships where the disposal of thermoplastic waste at sea is becoming an ever-increasing concern; and elsewhere. At most, only minor modifications to the basic apparatus would be required to adapt the present invention to any of these applications.

When segregated plastic densification is to be practiced, it may be advantageous to place the relevant SPI (The Society of the Plastics Industry) recycling code upon the resultant resin block to aid in recycling. This can be accomplished by placing a metal die plate at the bottom of the container prior to densification. Upon cooling the molten material, the SPI code will be imprinted on the block. This procedure can also be utilized with any embodiment of the present invention.

The following example further illustrates the essential features of the apparatus and method of the present invention. As will be apparent to those skilled in the art, the conditions used in the example are not meant to limit the scope of the invention.

EXAMPLE 1

This example demonstrates the ability of the apparatus and method of the present invention to effectively increase the bulk density of thermoplastic material, in particular, polystyrene foam articles.

A thermal densification unit of the type shown in FIGS. 4 through 6, having an interior volume of approximately 40 gallons, was designed and fabricated. The unit was constructed of cold rolled and galvanized steel. The heating system had a total capacity of 8000 watts, using commercially available heating elements. A thermocouple was located as shown in FIG. 6, the output of which was connected to the input of a commercially available temperature controller. Fiberglass insulation was employed.

To demonstrate the effectiveness of the unit at handling an average day's plastic waste for a typical, high volume fast-food restaurant, ten, 30-gallon bags of polystyrene foam containers (1000 containers) were obtained. Such containers are produced by, and available from, Mobil Chemical Co. of Canandaigua, N.Y. The controller of the unit's heater was set to provide a temperature of about 300° F. at the location of the thermocouple. The containers were dumped into the unit at the rate of one 30-gallon bag (100 containers) every 5–10 minutes until all 10 bags of containers had been put into the apparatus. The resultant block of polystyrene melt was then permitted to cool and solidify. The cooled material shrank away from the walls of the removable pan allowing easy removal from the pan.

The cooled thermoplastic block had a volume of 0.296 $ft^3$ and weighed approximately 12 pounds. Since the average closed, hinged-lid container, prior to the thermal densification process of the present invention had an average bulk density of approximately 0.25 lbs./$ft^3$, it can be seen that the very significant densification was obtained. The bulk density of the resultant block was approximately 40.6 lbs/$ft^3$.

As may be envisioned, if the typical fast-food restaurant generates 10–12 pounds of thermoplastic waste per day, a thermal densification unit of the type used in the above example can easily handle such waste in a period of approximately one to one and a half hours, with the store personnel only required to turn on the apparatus, load it, shut it off and remove the densified material from the pan. Only a few additional minutes are required each day to operate the densifier. The unit can be turned off overnight, which will permit the block of plastic to solidify for removal the next morning. The blocks so produced can be easily stored on site for pickup by a recycler, or returned to a central location by an unloaded supply truck making routine deliveries to the commercial location equipped with a thermal densification unit of the present invention.

EXAMPLE 2

This example demonstrates the ability of an alternate embodiment of the apparatus and method of the present invention to effectively increase the bulk density of thermoplastic material.

A thermal densification unit of the type shown in FIG. 7, having an interior volume of approximately 40 gallons, was designed and fabricated. The container employed was cylindrical, having an internal diameter of approximately 20 inches, and constructed of stainless steel. The container was fitted with a cover, also of stainless steel. Such a container is available from McMaster-Carr of Chicago, Ill. The heater was a conventional resistance-type drum platform heater, such a heater being available from McMaster-Carr of Chicago, Ill. A thermocouple was affixed to the outer skin of the container, near its base, the output of which was connected to the input of the controller. The exterior surface of the container was insulated. The unit built for this example had no ventilation system.

To demonstrate the effectiveness of the unit at handling an average day's plastic waste for a typical, high volume fast food restaurant, 10, 30-gallon bags of polystyrene foam cartons (1000 cartons) were obtained. Such cartons are produced by and available from Mobil Chemical Co. of Greenwich, Conn. The controller of the unit's heater was set to provide a temperature of about 400° F. at the inner surface of the container. The cartons were dumped into the stainless steel container at the rate of one 30-gallon bag (100 cartons) every 15–20 minutes until all 10 bags of cartons had been dumped into the container. The resultant pool of polystyrene melt was then cooled and solidified. In cooling the material for removal from the container, the following process was used: a) turn off the heat, b) cover the material with water to a 6 inch depth, and c) allow material to sit under water until cool. The cooled material shrank away from the walls of the container, released and floated to the surface for easy removal from the container.

The cooled disk measured 20 inches in diameter and was 1½ to 1¾ inches thick. The disk weighed approximately 12 pounds. Since the average carton, prior to the thermal densification process of the present invention had an average bulk density of approximately 0.25 lbs./$ft^3$, it can be seen that the very significant densification was obtained,since the bulk density of the resultant disk was on the order of approximately 40.6 lbs/$ft^3$.

As may be envisioned, if the typical fast food restaurant generates 10–12 pounds of thermoplastic waste per day, a thermal densification unit of the type used in the instant example can easily handle such waste in a period of approximately 2½ hours, with the only involvement from store personnel being the loading of the unit, such loading requiring less than about a minute per bag. The unit can be turned off overnight, which will permit the pool of plastic to solidify for removal the next morning. The disks so produced can be easily stored on site for pick-up by a recycler, or returned to a central location by an unloaded supply truck making routine deliveries to the commercial location equipped with the thermal densification unit of the present invention.

EXAMPLE 3

This example illustrates the ability of the apparatus and method of the present invention to effectively increase the bulk density of polyethylene bottles after use.

For this example, a bench top laboratory apparatus was configured utilizing a conventional hot plate with temperature controller, an insulated stainless steel beaker of a size capable of containing a one-gallon milk bottle prior to densification, a thermocouple and a pyrometer. The thermocouple was located on the outside surface of the beaker, near its bottom. The hot plate was set to control the temperature of the beaker to approximately 400° F.

Polyethylene milk bottles having an initial bulk density of approximately 0.08 lbs/$ft^3$ were introduced one at a time into the laboratory densification apparatus. Space constraints necessitated this manner of introduction. A total of 8 one-gallon bottles were densified in this manner with the resultant pool permitted to cool and solidify. The resultant block of material was weighed and found to have a bulk density of about 12 lbs/$ft^3$, equating to a volumetric densification on the order of 150 times original density.

When the process of the present invention is to be practiced aboard a ship, recycling of densified material may not be practical and disposal at sea still desired. To assure that the densified material does not float, it may be necessary to increase its specific gravity. To accomplish this, material of higher specific gravity can be added to the molten thermoplastic prior to cooling. Lead shot and the like an be utilized for this purpose.

While the apparatus of the present invention has been described as having utility primarily at commercial facilities, aboard ships and in refuse collection vehicles, other applications are within the scope of this invention. For example, envisioned is a unit sized and equipped for household use. Such units would have particular utility in locations where refuse trucks of the type incorporating the apparatus of the present invention were not available.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. A process for the thermal densification of post-consumer food contaminated thermoplastic waste for the recycling thereof, consisting essentially of the steps of:

(a) introducing post-consumer food contaminated thermoplastic waste into a chamber;

(b) heating the thermoplastic waste introduced into the chamber in step (a) with a heating system which includes a forced-air heating system adapted to produce a stream of heated air of a temperature effective for thermal densification of the thermoplastic waste;

(c) increasing the bulk density of the thermoplastic waste;

(d) exhausting the chamber;

(e) producing a block of thermoplastic material of increased bulk density;

wherein said stream of heated air renders any food remains present in or on the thermoplastic waste substantially bacterially inert.

2. The process of claim 1, wherein said step of heating to a temperature effective for thermal densification is conducted at a temperature of from about 250° F. to about 450° F.

3. The process of claim 2, wherein said step of heating to a temperature effective for thermal densification does not exceed a value which would alter the molecular weight of the thermoplastic waste by an amount exceeding 50% of original molecular weight.

4. The process of claim 1, wherein said bulk density increasing step increases the bulk density of the waste by at least about 100 percent of original bulk density.

5. The process of claim 4, wherein said bulk density increasing step increases the bulk density of the waste by at least about 2 to about 4 times original bulk density.

6. The process of claim 1, wherein said step of exhausting further comprises the step of diluting exhaust air using a source of outside air prior to exhausting.

7. The process of claim 1, wherein said step of heating utilizes at least one electrical resistance heater.

8. The process of claim 7, wherein said step of heating utilizes a fan to provide fan-forced air heating.

9. The method of claim 1 wherein said thermoplastic waste is polystyrene material.

10. A process for thermal densification of post-consumer, food contaminated thermoplastic waste for the recycling thereof, consisting essentially of the steps of:

(a) introducing post-consumer, food contaminated waste thermoplastic articles having a low bulk density into an enclosed chamber;

(b) heating the waste thermoplastic articles introduced into the chamber in contact with a stream of hot forced air to a temperature effective for thermal densification of the thermoplastic waste;

thereby increasing the bulk density of the thermoplastic waste and rendering food introduced with the thermoplastic articles substantially bacterially inert;

(c) recovering densified thermoplastic waste in block form.

11. The method of claim 10 wherein said thermoplastic waste is polystyrene material.

* * * * *